UNITED STATES PATENT OFFICE.

THOMAS TERRELL, OF LONDON, ENGLAND.

MANUFACTURE OF INCANDESCENT MANTLES.

987,333. Specification of Letters Patent. Patented Mar. 21, 1911.

No Drawing. Original application filed November 7, 1902, Serial No. 130,456. Divided and this application filed May 14, 1908. Serial No. 432,909.

*To all whom it may concern:*

Be it known that I, THOMAS TERRELL, a subject of the King of England, residing at London, in England, have invented certain new and useful Improvements in or Relating to the Manufacture of Incandescent Mantles, of which the following is a specification.

This invention relates to improvements in the manufacture of incandescent mantles the object being to obtain mantles of greater flexibility and efficiency and of less cost than heretofore, and the present application is a divisional from the application Serial No. 130,456, filed November 7th, 1902.

In carrying out this invention fine threads of cotton, linen or other cellulose of natural origin containing say 35,000 to 45,000 yards to the pound and preferably two or three ply, are mercerized and soaked in a concentrated solution of salts of the illuminating metals until the solution has thoroughly permeated the fibers. For example 2,000 grams of commercial nitrate of thorium (capable of yielding 48% of oxid) are dissolved in 1,500 cubic centimeters of distilled water and to this are added 20 grams of commercial nitrate of cerium. The fibers of cotton or other cellulose of natural origin are mercerized by treatment with potash, soda or hypochlorites and the fibers are then immersed in the above mentioned solution. In order to cause thorough absorption the fibers may be left in the solution for a prolonged period, say 48 hours: and for more complete impregnation the soaking may be performed in a vacuum by means of which air will be replaced from the interstices of the fiber by the nitrate solution. The soaked fiber is now pressed between rollers of india-rubber or the like to remove the solution from the surface, and the fiber is then carefully and thoroughly dried preferably in air at a temperature below 70° centigrade, as at higher temperatures the nitrates may dissociate and attack the fiber. Before drying, the fiber should weigh from 2.7 to 3 times its original weight and the dried fiber should contain about its own weight of salts. The dried threads are now immersed in a concentrated solution of ammonia (preferably of specific gravity 0.88) and are then washed in distilled water and dried, when they are ready for spinning or knitting. If desired the processes of dipping in the solution of salts, drying, treating with ammonia and washing out the nitrate of ammonia may be carried out more than once.

The mantle manufactured by this process will contain from 30% to 46% of anhydrous oxid of the illuminating metals in solid solution with the fiber and the mantle can be burned off and strengthened by collodion in the ordinary way.

Solid solution is a species of chemical combination as distinct from a mechanical mixture—a sponge full of water is a mechanical mixture—sugar dissolved in water is a liquid solution. The similar combination of two colloids such as cellulose and hydrated thorium oxid is a solid solution. A solid solution differs from a true chemical combination in that it is not limited to distinct proportions having relation to atomatic weights, but may take place in any proportion.

Attempts have been made heretofore to transform the salts of the illuminating metals to oxids by treating the fibers while moist with ammonia, but this method has always failed and has been abandoned. By thoroughly drying the soaked fibers however according to this invention it has been found that the action of the ammonia is quite different.

What I claim as my invention and desire to secure by Letters Patent is:—

1. The herein described process of manufacturing incandescent mantles which consists in mercerizing cellulose fibers of natural origin, soaking them in a concentrated solution of salts of the illuminating metals under a vacuum, drying the fibers, immersing them in a concentrated solution of ammonia, washing out the ammonia salts, drying the fibers and forming them into mantles.

2. The herein described process of manufacturing incandescent mantles which consists in mercerizing fibers of cotton, soaking them in a concentrated solution of salts of the illuminating metals under a vacuum, drying the fibers, immersing them in a concentrated solution of ammonia, washing out the ammonia salts, drying the fibers and forming them into mantles.

In testimony whereof I have signed my name to this specification in the presence of two subscribing witnesses.

THOMAS TERRELL.

Witnesses:
 ALFRED NUTTING,
 PERCY PHILLIPPS.